United States Patent [19]

Maeda

[11] Patent Number: 4,933,893

[45] Date of Patent: Jun. 12, 1990

[54] ARITHMETIC PROCESSING METHOD AND APPARATUS FOR PERFORMING ARITHMETIC OR LOGICAL OPERATIONS WITHIN A MINIMUM NUMBER OF OPERATION CYCLES

[75] Inventor: Hiromitsu Maeda, Kokubunji, Japan

[73] Assignee: Hitachi, Ltd., Tokyo, Japan

[21] Appl. No.: 295,279

[22] Filed: Jan. 10, 1989

[30] Foreign Application Priority Data

Jan. 13, 1988 [JP] Japan .................................. 63-3801

[51] Int. Cl.$^5$ .............................................. G06F 7/38
[52] U.S. Cl. .................................................. 364/736
[58] Field of Search ............... 364/736, 200 MS File, 364/748

[56] References Cited

U.S. PATENT DOCUMENTS 4,757,444  7/1988  Aoyama et al. ..................... 364/736
4,823,258  4/1989  Yamazaki ............................. 364/736

FOREIGN PATENT DOCUMENTS

59-47643  3/1984  Japan .

Primary Examiner—Gary V. Harkcom
Assistant Examiner—Long T. Nguyen
Attorney, Agent, or Firm—Antonelli, Terry, Stout & Kraus

[57] ABSTRACT

An arithmetic processing method and apparatus having first and second input registers and an arithmetic unit having a plurality of stages wherein an intermediate operation result of a previous iterative operation and input data are used to perform further iterative operations and obtain a final operation result as a vector sum. A serial number of input data is identified to check the order of the imputted data among a series of data to be processed. A control pattern to be used for control of the stages of the arithmetic processing unit is selected based on the identified serial number. The operation to be performed at each stage of the arithmetic processing unit is controlled in accordance with the selected control pattern, to obtain a final operation result to be outputted within a minimum number of operation cycles.

9 Claims, 6 Drawing Sheets

|←——————PRE-PROCESS——————→|

T = 1     T = 2     T = 3     T = 4

RAo/RBo   [V1][O]   [V2][O]   [V3][O]   □ □

RA1/RB1   □ □       [V1][O]   [V2][O]   [V3][O]

R2        □         □         [V1]      [V2]

R3        □         □         □         [V1]

T = 5     T = 6     T = 7     T = 8

□ [V1]    [V2][V1]  □ [V3]    □ [V3]

□ □       □ □       [V2][V1]  □ □

[V3]      □         □         [M]

[V2]      [V3]      □         □

——————POST-PROCESS——————

T = 9     T = 10    T = 11    T = 12

□ [V3]    [M][V3]   □ □       □ □

□ □       □ □       [M][V3]   □ □

□         □         □         [S]

[M]       □         □         □

T = 13

□ □

□ □

□

[S] SUM OF V1 ~ V3

F I G. 6

ARITHMETIC PROCESSING METHOD AND APPARATUS FOR PERFORMING ARITHMETIC OR LOGICAL OPERATIONS WITHIN A MINIMUM NUMBER OF OPERATION CYCLES

BACKGROUND OF THE INVENTION

The present invention relates to arithmetic processing techniques, and more particularly to an arithmetic processing method and apparatus suitable for performing a arithmetic or logical operation through a minimum number of operation cycles, such as in the case of executing a vector sum instruction wherein intermediate operation results during operation are used as input data to thus repeat similar operations and obtain a final result.

A known conventional arithmetic processing system for performing a vector sum operation or the like is disclosed, e.g., in the publication JP-A-59-47643 by the present assignee, and in other publications.

According to this system, in performing an arithmetic operation for a vector sum S of, e.g., L vector data, i.e., vector elements $V_1, V_2, \ldots, V_L$, wherein $$S = V_1 + V_2 + \ldots + V_L$$

the operation can be processed at high speed by changing the number of post-process operation cycles in accordance with the number L of operation data on the condition that the operation data number L is less than the operation stage number.

With the above-described conventional arithmetic processing system, the number of post-process operation cycles can be changed in accordance with the number of operation data, and if the operation data number is less than the operation stage number, the number of post-process operation cycles can be reduced to accordingly reduce a total number of operation cycles. However, such a system does not pay attention to the control of operation stages before the post-process cycles, thus posing a problem that the total number of operation cycles inclusive of the post-process cycles cannot be minimized.

SUMMARY OF THE INVENTION

It is therefore an object of the present invention to provide an arithmetic processing method and apparatus capable of performing an arithmetic or logical operation through a minimum number of operation cycles, wherein the number is exclusively determined by the number of operation data.

According to a teaching of the present invention, there is provided an arithmetic processing apparatus (system) which includes data identifier means for identifying the serial number of a vector element among the vector elements to be processed, the vector elements being assigned consecutive numbers, means for selecting a control pattern from predetermined control patterns to be used at operation stages, based on the identified serial number of the vector element, and control means for controlling the operation stages in accordance with the selected control pattern.

Data identifier means for determining the serial number of a data to be processed, detects the serial number of the data inputted to the arithmetic processing apparatus, and also detects a total number of data to be processed, upon detection of an end mark on the data.

Means for selecting a control pattern for operation stages based on the identified serial data number, determines prior to controlling the operation stages, a control pattern therefor in accordance with a rule described hereinunder.

First, the pre-process, ordinary process (or normal process), and post-process, which are used with the rule described later, will be defined.

(a) The pre-process refers to a process of inputting data including vector elements and intermediate operation results to all operation stages. In this case, if the number of vector elements is as small as that which is insufficient for filling the capacity of all operation stages, then this pre-process terminates when the last vector element is inputted to the operation stage.

(b) The ordinary process refers to a process of inputting, after vector elements have filled all the operation stages, the remaining vector elements and intermediate operation results to input registers. If the number of vector elements is as small as that which is insufficient for filling the capacity of all the operation stages, then this ordinary process is not present so that the post-process is performed immediately after the pre-process.

(c) The post-process refers to a process of obtaining a final operation result using intermediate operation results after all the vector elements have been inputted.

The arithmetic or logical operations of this invention is controlled in accordance with the following rule:

(I) During the pre-process, data is inputted alternately to two input registers. Data at each stage are transferred to the next stage at the cycle next to the cycle during which the data have been inputted to both the input registers.

(II) During the ordinary process, new data is inputted to one of the input registers, and an intermediate operation result is feedback inputted to the other.

(III) During the post-process, data in the input registers are transferred to the next stage on the condition that the data have been inputted to both the input registers. However, if only one of the input registers has been inputted with data, the data is held at the register until the other register is inputted with an intermediate operation result. Data in registers at stages downstream of the stage having the input registers are controlled to be transferred to the next stage every cycle.

According to the present invention, the operation stages are controlled by the above-described rule in accordance with a control pattern for respective operation stages, the control pattern being determined in correspondence with the identified serial number of input data.

DESCRIPTION OF THE PREFERRED EMBODIMENT

In order to make the invention easy to understand, a conventional technique will be described with reference to FIGS. 4 and 5, prior to giving the description of the embodiment of the present invention.

Figure 4:
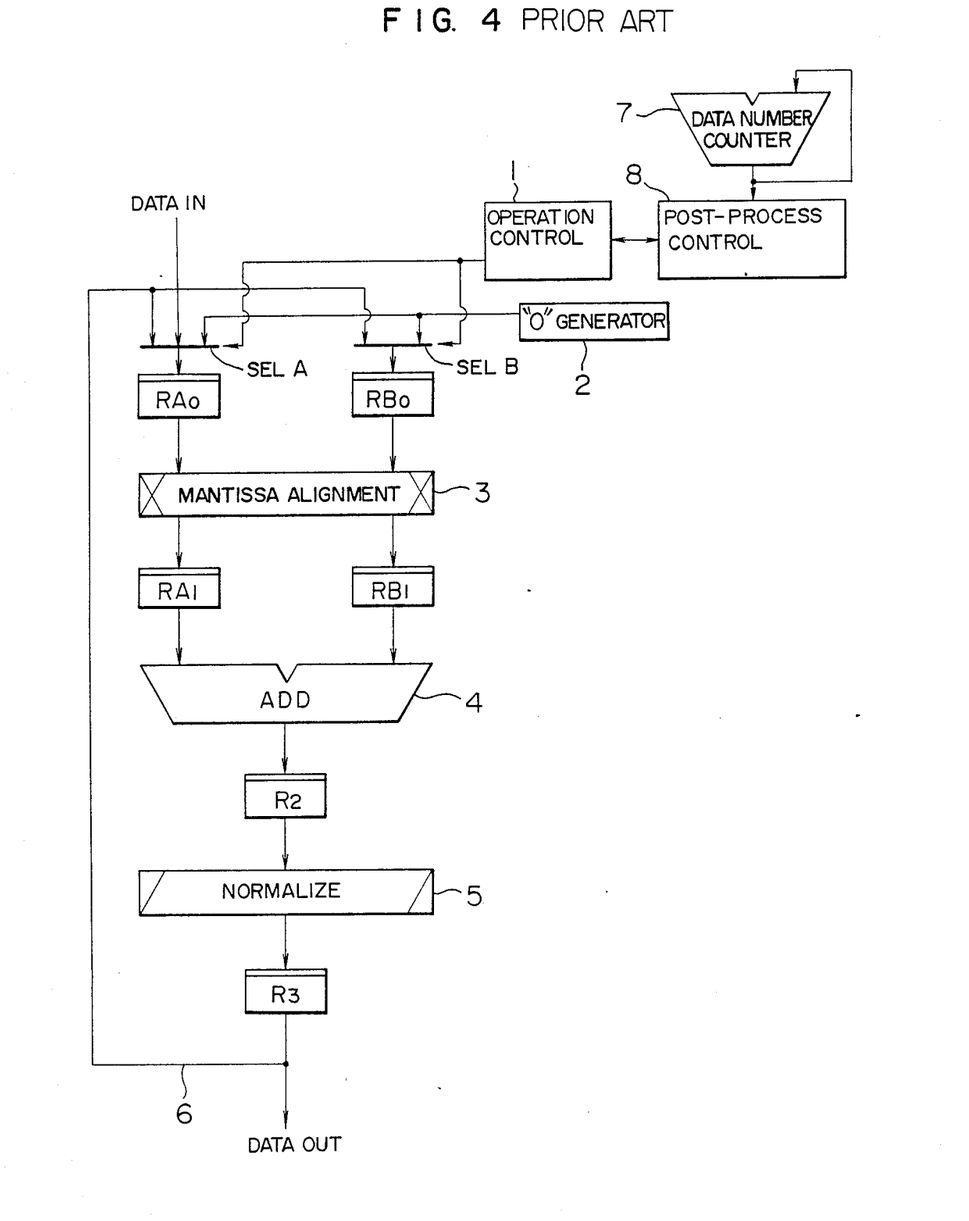
FIG. 4 is a block diagram showing an apparatus which operates in accordance with a conventional arithmetic processing method.
Figure 5:
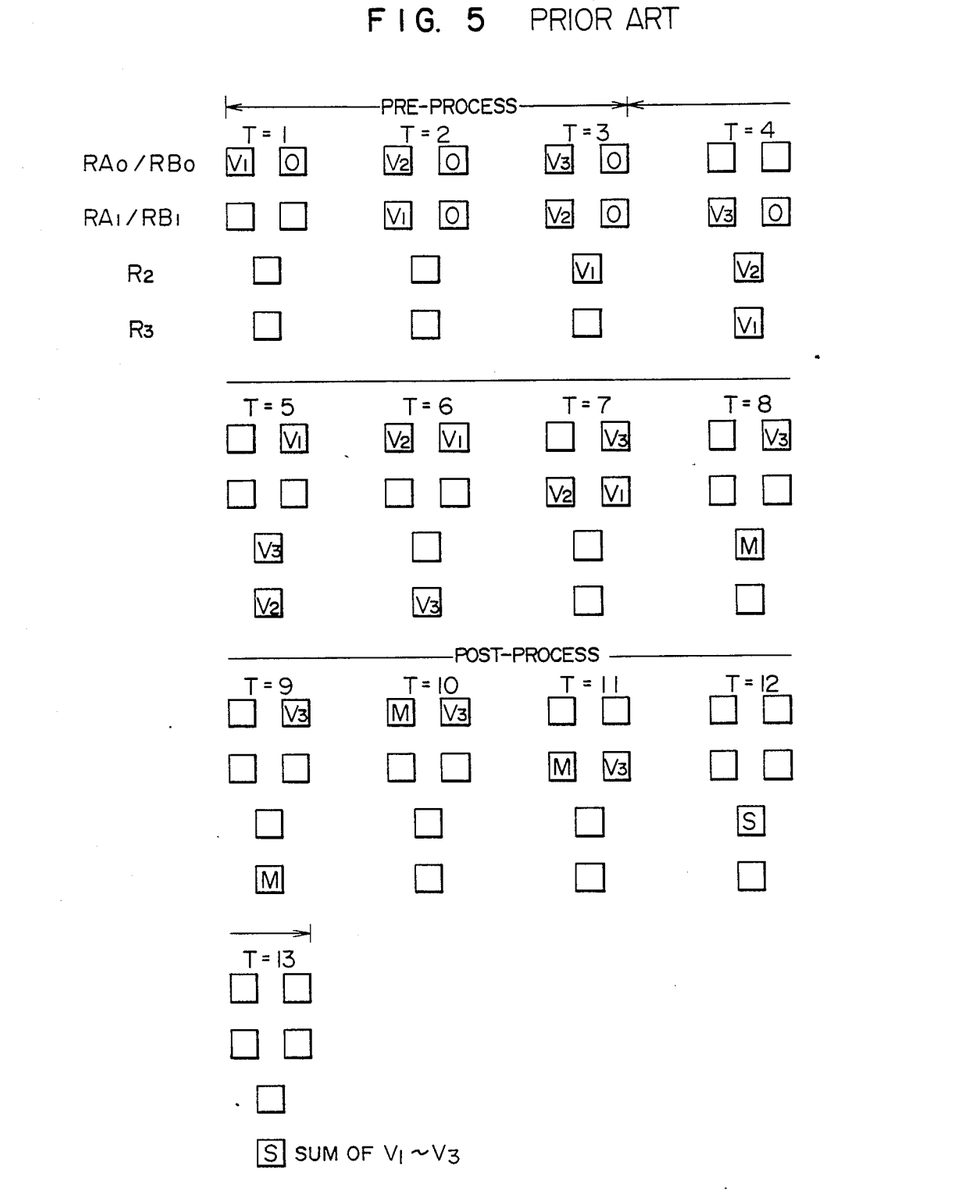
FIG. 5 is a diagram used for explaining the operation of the apparatus shown in FIG. 4.

FIG. 4 is a block diagram of the apparatus which operates in accordance with a conventional arithmetic processing method. The apparatus shown in FIG. 4 is constructed of an operation control unit 1, "0" generator 2, mantissa alignment circuit 3, adder 4, normalizing circuit 5, feedback path 6, data number counter 7, and post-process operation control unit 8.

In the conventional arithmetic processing apparatus shown in FIG. 4, the operation control unit 1 performs control of selection of input data, and of operation of registers and arithmetic operation units. The "0" generator 2 generates a constant "0". Input registers RA0 and RB0 are used for input of new data and intermediate operation results. The mantissa alignment circuit 3 pre-shifts and aligns data to be added together. Intermediate registers RA1 and RB1 store digit aligned data. A register R2 stores an addition result from the adder 4. The normalizing circuit 5 post-shifts for normalization of an addition result. An output register R3 stores and outputs an operation result. Data from the output register R3 is fed back to the input registers RA0 and RB0 via the feedback path 6. The data number counter 7 counts inputted data and detects the data number. The post-process operation control unit 8 determines the post-process cycle number based on the data number for control of the arithmetic operation.

The operation of the conventional apparatus constructed as above will be described with reference to FIG. 5 for the case of L=3, i.e., the number of input data is 3 including $V_1$, $V_2$ and $V_3$. FIG. 5 shows the change of state of registers RA0, RB0, RA1, RB1, R2 and R3 of the four operation stages, at each operation cycle. In FIG. 5, $V_1$, $V_2$ and $V_3$ represent vector data, S a sum of vector data, M an intermediate operation result such as $V_1+V_2$, and T=N (where N is 1 to 13) an operation cycle.

(1) At cycle 1, an input data $V_1$ is set in the input register RA0 via a selector SEL A, and a constant "0" is set in the input register RB0 via a selector SEL B.

(2) At cycle 2, the data $V_1$ and "0" in the input registers RA0 and RB0 are set in the intermediate registers RA1 and RB1, respectively, via the mantissa alignment circuit 3. In a similar manner at cycle 1, an input data $V_2$ and a constant "0" are set in the input register RA0 and RB0, respectively.

(3) At cycle 3, the data $V_1$ and "0" in the intermediate registers RA1 and RB1 are added together at the adder 4. The addition result is set in the register R2, and the data $V_2$ and "0" in the input registers RA0 and RB0 are set in the intermediate registers RA1 and RB1, respectively. In a similar manner at cycle 1, an input data $V_3$ and a constant "0" are set in the input registers RA0 and RB0, respectively.

The pre-process completes after the operations by cycles 1 to 3.

(4) At cycle 4, the data $V_1$ in the register R2 is normalized at the normalizing circuit 5 and set in the output register R3. The data $V_2$ and "0" in the intermediate registers RA1 and RB1 are added together at the adder 4. The addition result, i.e., data $V_2$, is set in the register R2. The data $V_3$ and "0" in the input registers RA0 and RB0 are set in the intermediate registers RA1 and RB1, respectively, via the mantissa alignment circuit 3.

(5) At cycle 5, the data $V_1$ in the output register R3 is set in the input register RB0 via the feedback path 6 and a selector upon a selection signal from the control unit 1. The data $V_2$ in the register R2 is set in the output register R3 via the normalizing circuit 5. The data $V_3$ and "0" in the intermediate registers RA1 and RB1 are added together at the adder 4, the addition result, i.e., data $V_3$, being set in the register R2.

(6) At cycle 6, the data $V_2$ in the output register R3 is set in the input register RA0 via the feedback path 6 and the selector upon a selection signal from the control unit 1. The data $V_3$ in the register R2 is set in the output register R3 via the normalizing circuit 5. In this case, the control unit 1 sends a set signal only to the registers RA0 and R3 so that the data $V_1$ in the input register RB0 is held therein.

(7) At cycle 7, the data $V_2$ and $V_1$ in the input registers RA0 and RB0 are set in the intermediate registers RA1 and RB1, respectively, via the mantissa alignment circuit 3. The data $V_3$ in the output register R3 is set via the feedback path 6 to the input register RB0.

(8) At cycle 8, the data $V_2$ and $V_1$ in the intermediate registers RA1 and RB1 are added together at the adder 4. The addition result, i.e., $M=V_1+V_2$, is set in the register R2. In this case, the control unit 1 does not set the input register RB0 so that the data $V_3$ in the input register RB0 is held therein.

(9) At cycle 9, the data M in the register R2 is set in the output register R3 via the normalizing circuit 5. Also at this cycle, the data $V_3$ in the input register RB0 is held therein.

(10) At cycle 10, the data M in the register R3 is set in the input register RA0 via the feedback path 6. The data $V_3$ in the input register RB0 is also held therein at this cycle.

(11) At cycle 11, the data M and $V_3$ in the input registers RA0 and RB0 are set in the intermediate registers RA1 and RB1, respectively, via the mantissa alignment circuit 3.

(12) At cycle 12, the data M and $V_3$ in the intermediate registers RA1 and RB1 are added together at the adder 4. The addition result $M+V_3$, namely in this example $V_1+V_2+V_3$ for the input data number of 3, is set in the register R2 as the sum S of the inputted data.

(13) At cycle 13, the data S in the register R2 is set in the register R3 via the normalizing circuit 5.

Since the input data number is 3, the processing for data summation terminates at this cycle. Such termination is judged from the post-process operation stage number 10 which has been previously determined by the post-process control unit 8 based on the data number 3 detected by the data number counter 3, by using, for example, the method disclosed in the above-mentioned JP-A-59-47643.

Figure 1:
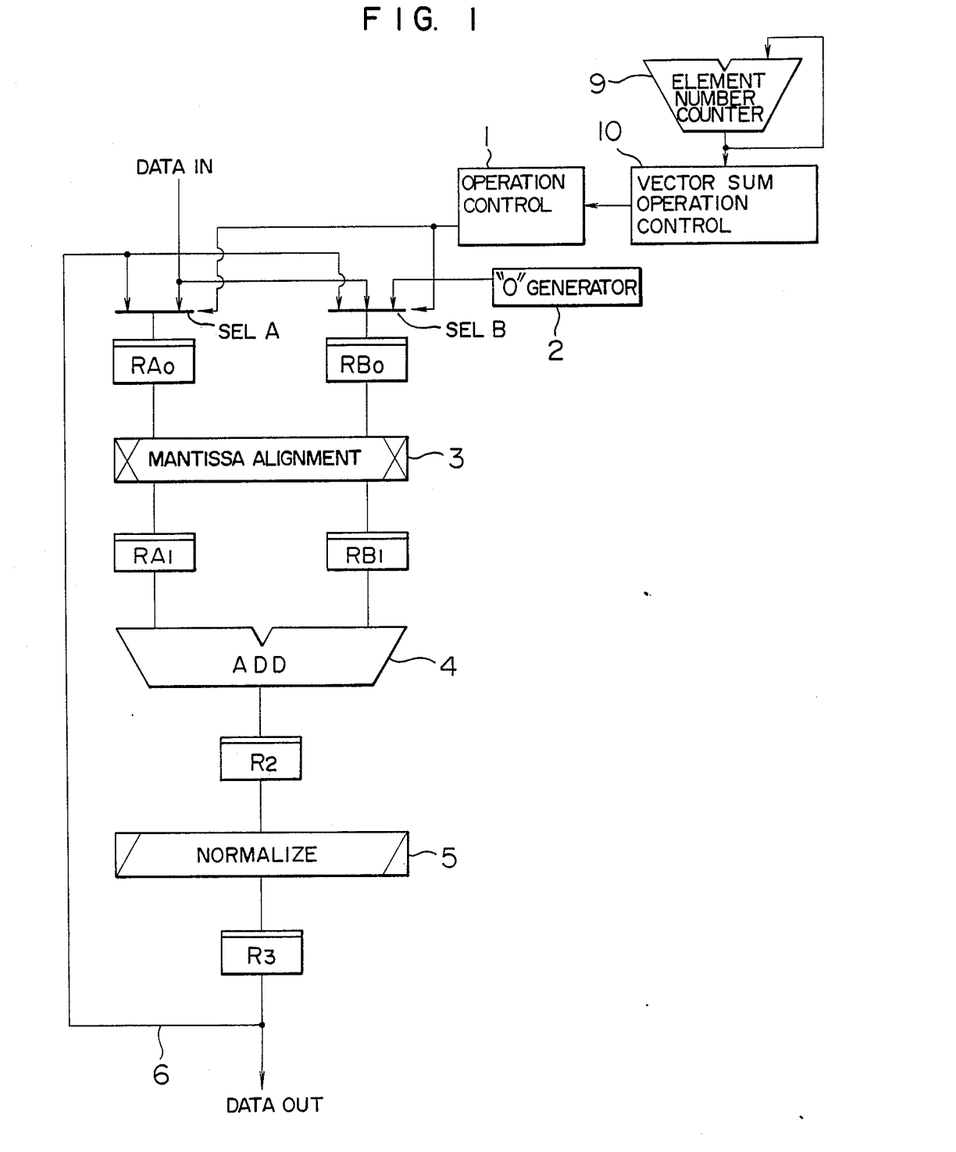
FIG. 1 is a block diagram showing an apparatus which operates in accordance with the arithmetic processing method of the present invention.
Figure 2:
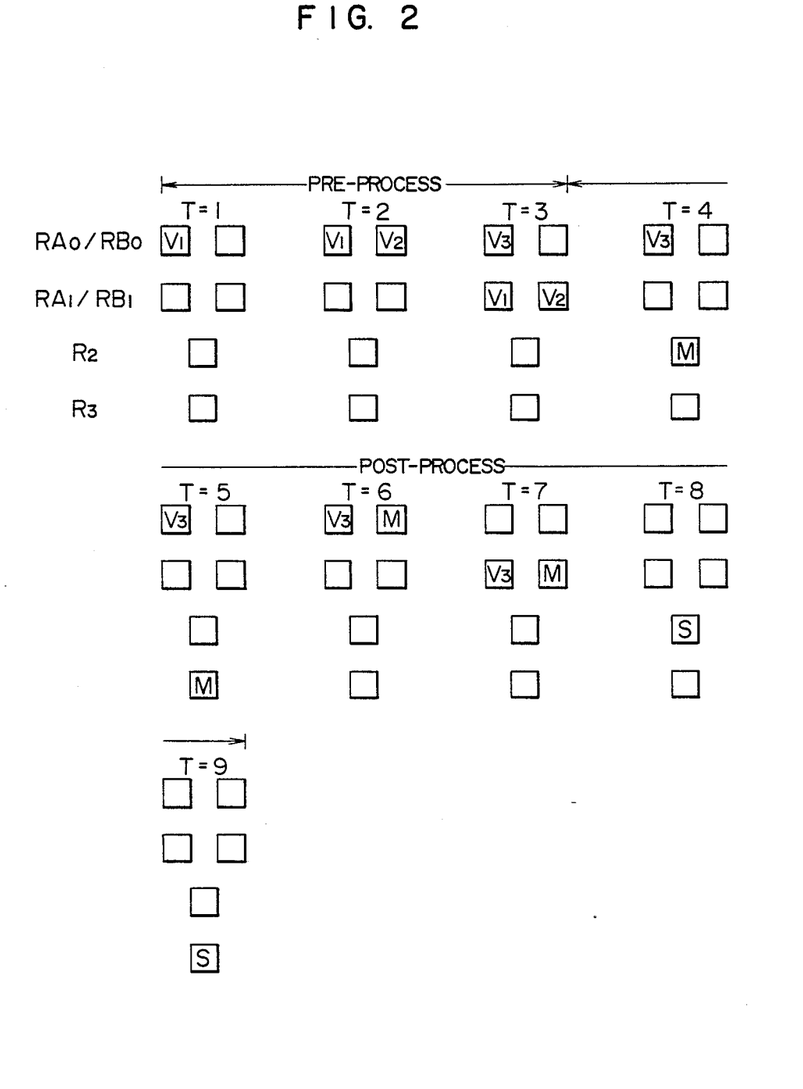
FIG. 2 is a diagram used for explaining the operation of the apparatus shown in FIG. 1.
Figure 3:
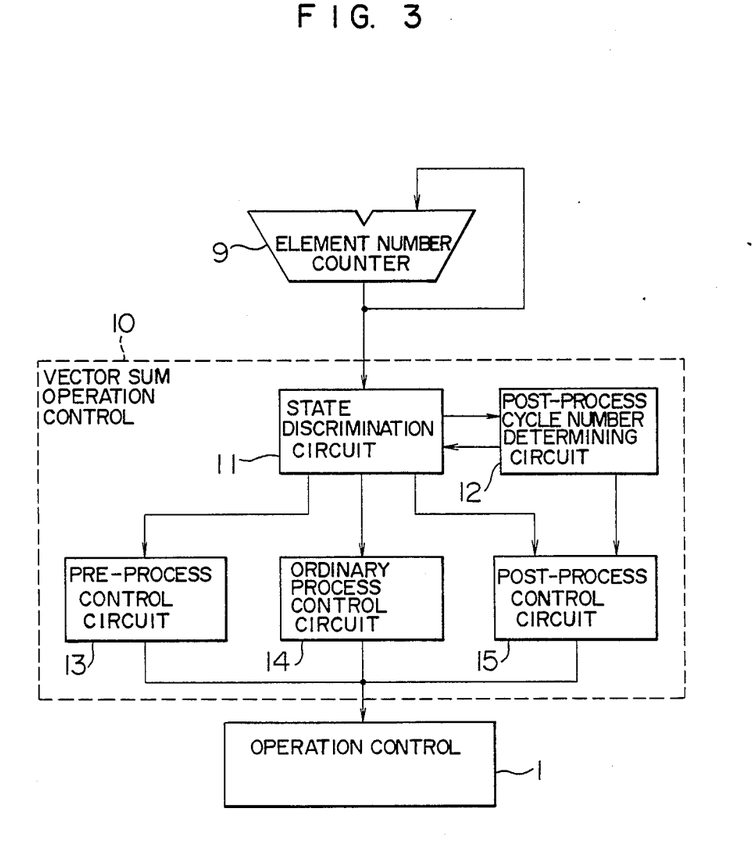
FIG. 3 is a block diagram showing the detail of a vector sum operation control unit 10 shown in FIG. 1.

Next, the embodiment of this invention will be described with reference to FIGS. 1 to 3. Referring to FIG. 1 showing the arithmetic processing system according to an embodiment of the invention and to FIG. 3 showing the detail of the control section of the system, a reference numeral 9 represents an element number counter for identifying a serial number of each element among input vector data, 10 a vector sum operation control unit, 11 a state discrimination circuit, 12 a post-process cycle number determining circuit, 13 a pre-process control circuit, 14 an ordinary process control circuit and 15 a post-process control circuit. The other reference numerals represent similar elements shown in FIG. 4.

The apparatus which operates in accordance with the arithmetic processing method of the invention differs from the conventional technique in that instead of the data number counter 7 and post-process operation control unit 8 shown in FIG. 4, there are provided the element number counter 9 for detecting the element number of vector data, and the vector sum operation control unit 10 for selecting and determining, for control of arithmetic or logical operation, a control pattern derived in accordance with the above-described rule. The other arrangement of the apparatus may use the same structure as conventional.

The vector sum operation control unit 10 includes, as shown in FIG. 3, the state discrimination circuit 11, post-process cycle number decision circuit 12, pre-process control circuit 13, ordinary process control circuit 14 and post-process control circuit 15. The state discrimination circuit 11 discriminates the state of the apparatus as to what process among the pre-process, ordinary process and post-process the apparatus is now performing, based on the vector data element number. The post-process cycle number determining circuit 12 determines the number of post-process cycles based on the total vector data element number when the state discrimination circuit 11 discriminates the start of post-process. The pre-process control circuit 13 controls the pre-process based on the vector data element number while the state discrimination circuit 11 discriminates the pre-process. The normal process control circuit 14 controls the ordinary process based on the vector data element number while the state discrimination circuit 11 discriminates the ordinary process. The post-process control circuit 15 controls the post-process, based on the vector data element number, total element number, and post-process cycle number determined by the post-process cycle number decision circuit 12, while the state discrimination circuit 11 discriminates the post-process. The control circuits 13, 14 and 15 are constructed of, e.g., gate logics, programmed ROMs or the like in such a manner that a control signal pattern for operation at respective stages is generated in one-to-one correspondence with a serial vector data element number.

The operation of the apparatus constructed as above and performing the arithmetic or logical operation of this invention will be described with reference to FIG. 2, for the data number of L=3 as was applied by way of example to the above conventional apparatus. The representation used in FIG. 2 is similar to that in FIG. 4. In the present case, data is inputted during the pre-process alternately to input registers RA0 and RB0 initially to the input register RA0. Intermediate operation results during arithmetic or logical operation are inputted during the post-process to the input registers, initially to the input register RB0 when both registers are ready or vacant.

Control patterns of selection signals to selectors SEL A and SEL B and set signals to the registers are as shown in Table 1 by way of example. The control pattern is used in the following operation for the vector element number of 3.

TABLE 1

| No. | CONTROL SIGNAL | OPERATION CYCLE 1 2 3 4 5 6 7 8 9 |
|---|---|---|
| 1 | SEL A (0-1) | 0 0 0 0 0 0 0 0 0 |
| 2 | SEL B (0-1) | 0 0 0 0 0 1 0 0 0 |
| 3 | SET RA0 | 1 0 1 0 0 0 0 0 0 |
| 4 | SET RB0 | 0 1 0 0 0 1 0 0 0 |
| 5 | SET RA1 | 0 0 1 0 0 0 1 0 0 |
| 6 | SET RB1 | 0 0 1 0 0 0 1 0 0 |
| 7 | SET R2 | 0 0 0 1 0 0 0 1 0 |
| 8 | SET R3 | 0 0 0 0 1 0 0 0 1 |

In Table 1, numbers 1 and 2 represent select signals by which SEL A for the input register RA0 and SEL B for the input register RB0 are controlled for selection of input signal thereto, respectively. The values 0 to 3 of a selector signal mean that:

0: select input data
1: select fed-back intermediate operation result
2: select constant "0"

Numbers 3 to 8 represent set signals by which the input registers RA0 and RB0, intermediate registers RA1 and RB1, register R2 and output register R3 are controlled, respectively in this order. The values 0 and 1 of a set signal mean that:

0: remained unchanged (value in register at the preceding cycle is held unchanged)
1: write data in register The representation of a selector signal No. 1 or 2 is intended to indicate that SEL A(0-1), for example, means that the signal is composed of 2 bits of SEL A(0) and SEL A(1).

(1) At cycle 1, in response to the first inputted data the element number counter 9 detects an element serial number 1. The state discrimination circuit 11 discriminates based on the detection result of the element number 1 that the arithmetic processing apparatus is under the pre-process. In response to the discriminated pre-process and the odd element number, the pre-process control circuit 13 sets the input data $V_1$ in the input register RA0.

(2) At cycle 2, the element number counter 9 detects the element number 2. The state discrimination circuit 11 discriminates based on the detection result of the element number 2 that the apparatus is under the pre-process. In response to the discriminated pre-process and the even element number, the pre-process control circuit 13 sets the inputted data $V_2$ in the input register RB0. At this cycle, the data $V_1$ in the input register RA0 is held therein.

(3) At cycle 3, the element number counter 9 detects the element number 3 based on the data with an end mark. The state discrimination circuit 11 discriminates based on the detection result of the element number 3 that the apparatus is under the pre-process. In response to the discriminated pre-process and the odd element number, the pre-process control circuit 13 pre-shifts the data $V_1$ and $V_2$ at the mantissa alignment circuit 3 to set them in the intermediate registers RA1 and RB1, respectively, and to set the input data $V_3$ in the input register RA0.

In the foregoing operations, the element number 3 detected by the element number counter 9 represents the total data number, so that all the data have been inputted to thus terminate the pre-process. At this time, the state discrimination circuit 11 discriminates based on the detection result of the total data number 3 that the ordinary process is not needed and the post-process will follow at the next cycle. The circuit 11 also instructs the circuit 12 to determine the number of post-process cycles for the case of the total data number 3.

(4) At cycle 4, the state discrimination circuit 11 discriminates, based on the fact that all the data have been inputted at cycle 3, that the apparatus is under the post-process. The post-process cycle number determining circuit 12 determines the cycle number necessary for the post-process as 6, based on the total data number 3. The post-process cycle number 6 is notified to the state discrimination circuit 11 and post-process control circuit 15. The post-process cycle number can be determined exclusively from the detected total data number in accordance with the above-described rule of the processing method of the present invention. The state discrimination circuit 11 with the information of post-process cycle number being supplied discriminates at the following 6 cycles, i.e., from cycle 4 to cycle 9, that the apparatus is under the post-process. The post-process control circuit 15 starts controlling the first cycle (T=4) for the post-process for the case of the total data number 3. In particular, the data $V_1$ and $V_2$ in the intermediate registers RA1 and RB1 are added together at the adder 4, the addition result M, i.e., $M=V_1+V_2$, being set in the register R2. The data $V_3$ in the input register RA0 is held therein because there is no data in the input register RB0.

(5) At cycle 5, the post-process control circuit 15 controls the second cycle (T=5) of the post-process for the case of the total data number 3. In particular, the post-process control circuit 15 sets the intermediate operation result M in the register R2 in the output register R3 via the normalizing circuit 5. The data $V_3$ in the input register RA0 is held therein because there is no data in the input register RB0.

(6) At cycle 6 (T=6), the post-process control circuit 15 controls the third cycle (T=6) of the post-process for the case of the total data number 3. In particular, the post-process control circuit 15 sets the intermediate operation result M in the output register R3 in the input register RB0 via the feedback path 6. Also at this cycle, the data $V_3$ in the input register RA0 is held therein.

(7) At cycle 7 (T=7), the post-process control circuit 15 controls the fourth cycle (T=7) of the post-process for the case of the total data number 3. In particular, the post-process control circuit 15 sets the data $V_3$ and M fetched in both the input registers RA0 and RB0 in the intermediate registers RA1 and RB1, respectively, via the fixed-point part digit alignment circuit 3.

(8) At cycle 8 (T=8), the post-process control circuit 15 controls the fifth cycle (T=8) of the post-process for the case of the total data number 3. In particular, the post-process control circuit 15 adds together the data $V_3$ and M fetched in both the intermediate registers RA1 and RB1 at the adder 4, the addition result $V_3+M$, i.e., the sum result S of $V_1+V_2+V_3$, being set in the register R2.

(9) At cycle 9, the post-process control circuit 15 controls the last cycle or sixth cycle of the post-process for the total data number 3. In particular, the post-process control circuit 15 sets the sum result S in the register R2 into the output register R3 via the normalizing circuit 5. Upon completion of this cycle, the post-process and hence all the arithmetic processing operations terminate to accordingly obtain the final arithmetic operation result S.

Since the data number has been assumed as L=3 in the above embodiment, the arithmetic processing completes without using the ordinary process control circuit 14. However, for the case of the data number L equal to or larger than 9, the ordinary process control circuit 14 is used. In this case, the state discrimination circuit 11 discriminates based on the element number equal to or larger than 9 that the apparatus is under the ordinary process. During the ordinary process, the ordinary process control circuit 14 controls to set new data in the input register RA0 and the fed-back intermediate operation result in the input register RB0. The "0" generator 2 is not used also for the case of the data number L=3. The "0" generator 2 is used however for the case of, e.g., the data number L=1 upon instruction from the pre-process circuit 13.

As seen from the foregoing description of the embodiment of the present invention, in obtaining the sum of data while feeding back intermediate operation results, the final operation result can be obtained with a minimum number of operation cycles which depend upon the input data number. Therefore, an arithmetic or logical processing can be performed at high speed as compared with a conventional arithmetic processing system.

Figure 6:
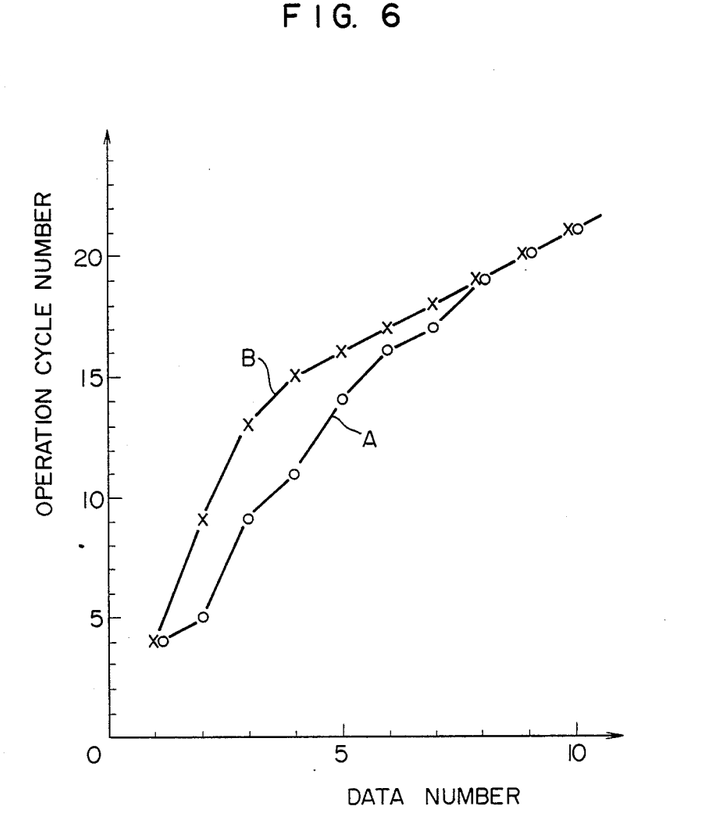
FIG. 6 is a graph showing the relationship between the number of operation data and the number of operation cycles required.

FIG. 6 shows the relationship between the number of data to be processed and the number of operation cycles required. Curve A stands for the present method, and a curve B stands for a conventional method. As understood from FIG. 6, the present method allows to reduce the number of operation cycles at a maximum of 4 cycles for the case of data numbers 2 to 7, as compared with the conventional method.

In the embodiment of the present invention, the number of operation stages has been assumed as 4 including the input registers RA0 and RB0, intermediate registers RA1 and RB1, operation result register R2 and output register R3. However, the invention is also applicable to different stage numbers, with the same advantageous effects described above.

As appreciated from the foregoing description of the invention, an arithmetic or logical operation can be performed with a minimum number of operation cycles determined exclusively by the number of data to be processed. Therefore, an arithmetic or logical operation can be performed at high speed and with high efficiency for those operations such as vector sum operation, scalar product operation wherein intermediate operation results are used as input data and similar operations are repeated to obtain a final arithmetic or logical operation result.

What is claimed is:

1. A method of operating an arithmetic or logic operation system which includes at least first and second input registers, an arithmetic processing unit having a plurality of stages and a control unit for controlling said first and second input registers and said arithmetic processing unit and wherein intermediate results obtained during operations performed by said arithmetic processing unit are supplied to one of said first and second input registers as input vector element data to successively perform iterative operations and obtain a final result, said method comprising the steps of:

identifying a serial number of input vector element data of a series of input vector element data to be processed, each input vector element data of said series of input vector element data being assigned a serial number;

selecting a control pattern from predetermined control patterns defining operations to be performed by each stage of said arithmetic processing unit, based on said identified serial number of said input vector element data; and performing operations on said input vector element data and intermediate operation results by said arithmetic processing unit by controlling said stages of said arithmetic processing unit in accordance with said selected control pattern.

2. A method of operating an arithmetic or logical operation system which includes at least first and second input registers, an arithmetic processing unit having a plurality of stages and a control unit for controlling said first and second input registers and said arithmetic processing unit and wherein intermediate results obtained during operations performed by said arithmetic processing unit are supplied to one of said first and second input registers as input vector element data to successively perform iterative operations and obtain a final result, said method comprising the steps of:

identifying a serial number of input vector element data of a series of input vector element data to be processed, each input vector elements data of said series of input vector element data being assigned a serial number;

selecting a control pattern from predetermined control patterns defining operations to be performed by each stage of said arithmetic processing unit, based on said identified serial number of said input vector element data; and performing operations on said input vector element data and intermediate operation results by said arithmetic processing unit by controlling said stages of said arithmetic processing unit in accordance with said selected control pattern;

wherein said control pattern is used for execution of at least a pre-process and a post-process for consecutively inputted input vector element data, said pre-process being a process during which all stages of said arithmetic processing unit are full of input vector element data and said post-process being a process during which after input of said series of input vector element data, a final operation result is obtained using intermediate operation results; and wherein during said pre-process, input vector element data is inputted alternately to said first and second input registers, and both said first and second input registers transfer input vector element data to a first stage of said arithmetic processing unit at a certain operation cycle, thereafter said inputted input vector element data is transferred to a succeeding stage of said arithmetic processing unit at a succeeding operation cycle, and during said post-process, if one of said first and second input registers is not still inputted with input vector element data, input vector element data inputted to the other of said first and second input registers is not transferred to a next stage of said arithmetic processing unit until said one input register is inputted with input vector element data, and input vector element data held in a succeeding stage of said arithmetic processing unit is transferred to a further succeeding stage of said arithmetic processing unit.

3. A method according to claim 2, wherein an ordinary process after said pre-process is performed based on said selected control pattern if the number of input vector element data to be processed exceeds a predetermined number, said ordinary process being a process during which after all of said stages of said arithmetic processing unit are inputted with input vector element data, the remaining input vector element data of said series of input vector element data are all inputted, and wherein said post-process starts executing after said ordinary process, if the number of said input vector element data does not exceed the predetermined number.

4. A method according to claim 2, wherein under control of said selected control pattern, said series of input vector element data are sequentially inputted to said first and second input registers initially to said first input register in said pre-process, and feed-back intermediate operation results fed back from the last stage of said arithmetic processing unit are sequentially inputted to said first and second input registers, initially to said second input register when both input registers are in a vacant state.

5. An arithmetic processing system wherein an intermediate operation results obtained during one iterative operation is used as input data to the system to perform further iterative operations to obtain a final operation result, said system comprising:

processing means including a predetermined number of successively connected processing units for processing input data and intermediate operation results, wherein a last one of said processing units provide an intermediate operation result;

control means for controlling independently processing operations performed by said predetermined number of successively connected processing units;

data identifier means for identifying a serial number of presently inputted data, serial numbers being previously and consecutively assigned to a series of data to be inputted to and processed by said processing means; and control pattern selecting means for selecting a control pattern from predetermined control patterns in accordance with said identified serial number from said data identifier means, each of said predetermined control patterns being in one-to-one correspondence with said serial numbers assigned to said series of data and defining a processing operation to be performed by each of said predetermined number of processing units; and wherein said control means activates each of said predetermined number of processing units in accordance with said selected control pattern from said control pattern selecting means.

6. An arithmetic processing system wherein an intermediate operation result obtained during one iterative operation is used as input data to the system to perform further iterative operations to obtain a final operation result, said system comprising:

processing means including a predetermined number of successively connected processing units for processing input data and intermediate operation results, wherein a last one of said processing units provide an intermediate operation result;

control means for controlling independently processing operations performed by said predetermined number of successively connected processing units;

data identifier means for identifying a serial number of presently inputted data, serial numbers being previously and consecutively assigned to a series of data to be inputted to and processed by said processing means; and control pattern selecting means for selecting a control pattern from predetermined control patterns in accordance with said identified serial number from said data identifier means, each of said predetermined control patterns being in one-to-one correspondence with said serial numbers assigned to said series of data and defining a processing operation to be performed by each of said predetermined number of processing units; and wherein said control means activates each of said predetermined number of processing units in accordance with said selected control pattern from said control pattern selecting means wherein said data identifier means includes means for identifying a serial number of said series of data inputted to the system for processing thereof, and for detecting an end mark of a data indicating that said data is the last data to be inputted of said series of data to provide an indication of a total number of said series of data.

7. An arithmetic processing system wherein an intermediate operation result obtained during one iterative operation is used as input data to the system to perform further iterative operations to obtain a final operation result, said system comprising:

processing means including a predetermined number of successively connected processing units for processing input data and intermediate operation results, wherein a last one of said processing units provide an intermediate operation result;

control means for controlling independently processing operations performed by said predetermined number of successively connected processing units;

data identifier means for identifying a serial number of presently inputted data, serial numbers being previously and consecutively assigned to a series of data to be inputted and processed by said processing means; and control pattern selecting means for selecting a control pattern from predetermined control patterns in accordance with said identified serial number from said data identifier means, each of said predetermined control patterns being in one-to-one correspondence with said serial numbers assigned to said series of data and defining a processing operation to be performed by each of said predetermined number of processing units; and wherein said control means activates each of said predetermined number of processing units in accordance with said selected control pattern from said control pattern selecting means;

wherein said processing means includes at least first and second input registers, and in response to output of said control pattern selecting means, said control means generates an instruction signal for independently designating the operations to be performed by said predetermined number of processing units, during a pre-process, ordinary process and postprocess, said pre-process being a process during which all of said processing units are full of data, said ordinary process being a process during which after all of said processing units are inputted with data, the remaining data of said series of data are all inputted, and said post-process being a process during which after input of said series of data a final operation result is obtained using intermediate operation results, and said instruction signal independently designates the processing operation to be performed by each of said processing units in such a manner that wherein during said pre-process, data is inputted alternately to said first and second input registers, and after both said first and second input registers of a first processing unit are inputted with data at a certain operation cycle, said inputted data is transferred to a next processing unit at a next operation cycle;

wherein during said ordinary process, new data is inputted to said first input register and intermediate operation data is feedback inputted to said second input register; and wherein during said post-process, if one of said first and second input registers is not still inputted with data, data inputted to the other of said first and second input registers is not transferred to the next processing unit until said one input register is inputted with data, and data held in first and second registers of the next processing unit is transferred to a further next processing unit every operation cycle.

8. A system according to claim 7, wherein said input data is vector element data;

said data identifier means includes a vector element number counter for identifying said serial number of newly inputted vector element data; and said control pattern selecting means includes a vector operation control means for controlling a vector sum operation;

said vector operation control means includes state discrimination means coupled to an output of said element number counter for discriminating, based on a vector element number identified by said element number counter, which state among said pre-process, ordinary process and post-process the system takes, post-process cycle number determining means responsive to a start of said post-process discriminated by said state discrimination means for determining the number of post-process cycles based on a total number of vector element data in said series of data;

pre-process control means for controlling said pre-process in accordance with the vector element number while said state discrimination means discriminates said pre-process, ordinary process control means for controlling said ordinary process in accordance with the vector element number while said state discrimination means discriminates said ordinary process, and post-process control means for controlling said post-process in accordance with the vector element number, the total number of vector elements and the post-process cycle number determined by said post-process cycle number determining means while said state discrimination means discriminates said post-process.

9. A system according to claim 8, wherein under control of said control means and in accordance with an output from said control pattern selecting means, said series of data are sequentially inputted to said first and second input registers initially to said first input register in said pre-process, and intermediate operation results fed back from a last one of said processing units during said post-process are sequentially inputted to said first and second input registers initially to said second input register when both registers are vacant.

* * * * *